United States Patent [19]
Beim et al.

[11] Patent Number: 5,716,298
[45] Date of Patent: Feb. 10, 1998

[54] MULTIPLE-SPEED AUTOMATIC TRANSMISSION FOR AN AUTOMOTIVE VEHICLE

[75] Inventors: Rudolf Beim, Bloomfield Hills; Daniel W. McCarrick, Canton, both of Mich.

[73] Assignee: Ford Global Technologies, Inc., Dearborn, Mich.

[21] Appl. No.: 626,415

[22] Filed: Apr. 2, 1996

[51] Int. Cl.⁶ ......................................... F16H 3/62
[52] U.S. Cl. .................. 475/275; 475/276; 475/281
[58] Field of Search ........................... 475/275, 276, 475/277, 281, 284

[56] References Cited

U.S. PATENT DOCUMENTS

| | | | |
|---|---|---|---|
| 3,863,524 | 2/1975 | Mori et al. | 475/276 |
| 3,946,622 | 3/1976 | Murakami et al. | 475/281 |
| 3,946,623 | 3/1976 | Murakami et al. | 475/276 |
| 3,979,974 | 9/1976 | Murakami | 475/276 X |
| 4,143,562 | 3/1979 | Murakami et al. | 475/276 |
| 4,242,924 | 1/1981 | Melhorn et al. | 475/280 |
| 4,368,649 | 1/1983 | Vahratian et al. | 475/277 |
| 4,418,585 | 12/1983 | Pierce | 475/282 |
| 4,483,215 | 11/1984 | Ishimaru et al. | 475/276 X |
| 4,509,389 | 4/1985 | Vahratian et al. | 475/278 |
| 4,702,125 | 10/1987 | Kalns | 475/281 |
| 4,939,955 | 7/1990 | Sugano | 475/286 |
| 4,976,670 | 12/1990 | Klemen | 475/279 |
| 5,007,887 | 4/1991 | Asada | 475/284 |
| 5,222,923 | 6/1993 | Hotta et al. | 475/276 |

FOREIGN PATENT DOCUMENTS

| | | | |
|---|---|---|---|
| 2-72245 | 3/1990 | Japan | 475/276 |
| 4-140540 | 5/1992 | Japan | 475/276 |
| 2272735 | 5/1994 | United Kingdom. | |

*Primary Examiner*—Khoi Q. Ta
*Attorney, Agent, or Firm*—Frank G. McKenzie

[57] ABSTRACT

A multiple-speed automatic transmission includes two simple planetary gear units and a third double planetary gear unit having two sets of planet pinions engaged mutually, one of the sets engaged continually with a sun gear and the other set engaged continually with a ring gear. An input shaft is driveably connected to the carrier of the double gear unit and to the sun gear of a first simple gear unit. The output is taken on a common element driveably connected to the ring gear of the second gear unit, carrier of the first gear unit, and an output shaft. The sun gear of the double gear unit is permanently fixed against rotation. A first brake is adapted to hold the sun gear of the second gear unit against rotation and a brake band is adapted to hold the carrier of the second gear unit against rotation. A first friction clutch connects the ring gear of the third gear unit, sun gear of the second gear unit, and carrier of the third gear unit mutually. A second clutch driveably connects the ring gear of the second gear unit to the input shaft, and another clutch driveably connects the carrier of the double planetary gear unit and carrier of the second gear unit.

13 Claims, 1 Drawing Sheet

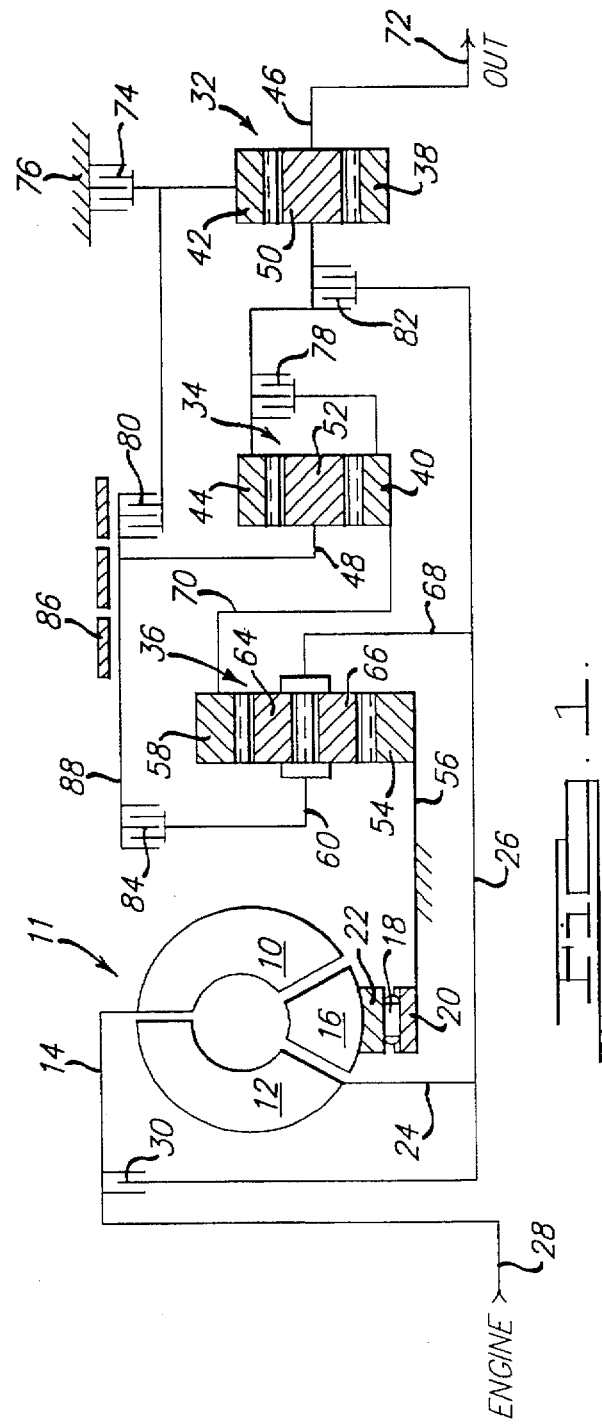

MULTIPLE-SPEED AUTOMATIC TRANSMISSION FOR AN AUTOMOTIVE VEHICLE

BACKGROUND OF THE INVENTION

1. Technical Field

This invention relates to an arrangement of clutchs, brakes, and planetary gear units of an automatic transmission for a motor vehicle.

2. Description of the Prior Art

The gear system of U.S. Pat. No. 4,418,585 includes a pair of planetary gear units mounted on a first axis and an hydrokinetic torque converter mounted on a second axis parallel to the first axis. These are arranged to accommodate a vehicle engine that is mounted transversely with respect to the center plane of a motor vehicle. The transmission is able to provide four forward driving ratios and a single reverse ratio, the highest forward driving ratio being an overdrive.

U.S. Pat. No. 4,368,649 discloses planetary gearing that achieves a ratio change from the third to the fourth forward ratio without establishing timed disengagement of a high speed ratio clutch and application of a friction brake. It is only necessary to apply a single friction brake to achieve a ratio change to the highest ratio. A ratio change from the first to the second forward drive ratio results merely by engaging a second friction brake while the companion friction clutch remains applied. Therefore, a ratio change from the first ratio and from the third ratio in a forward range results merely by engaging and disengaging a single friction element, either a clutch or a brake, thereby greatly simplifying control of the clutches and smoothing the ratio changes during vehicle acceleration from a standing start.

SUMMARY OF THE INVENTION

It is an object of this invention to provide a multiple-speed automatic transmission having five forward speed ratios and a reverse drive ratio. An advantage of the invention is producing each gear ratio by engaging only one friction element at a time. This permits each friction element to be sized specifically for the corresponding ratio. No swap shifting is required.

In realizing these advantages and objects, a multiple-speed automatic transmission according to this invention includes an input shaft; an output shaft; and planetary gearing supported on a first axis. The gearing includes first and second planetary gear units, each gear unit having a sun gear, ring gear, carrier, and planet pinions supported rotatably on the carrier and driveably engaged with the sun gear and ring gear, and a third planetary gear unit having a sun gear, ring gear, carrier, and first and second planet pinions supported rotatably on the carrier, the first planet pinion driveably engaged with the sun gear, the second planet pinion driveably engaged with the ring gear and first planet pinion.

The input shaft, carrier of the third gear unit, and sun gear of the first gear unit are continually driveably connected mutually. The ring gear of the third gear unit is continually driveably connected to the sun gear of the second gear unit. The ring gear of the second gear unit, carrier of the first gear unit, and output shaft are continually driveably connected mutually.

A first brake alternately holds against rotation and releases the ring gear of the first gear unit. A first brake alternately holds against rotation and releases the sun gear of the first gear unit. A first clutch alternately driveably connects and releases the ring gear of the second gear unit and sun gear of the second gear unit. A second clutch alternately driveably connects and releases the ring gear of the first gear unit and carrier of the second gear unit. A third clutch alternately driveably connects and releases the carrier of the first gear unit and input shaft. A fourth clutch alternately driveably connects and releases the carrier of the second gear unit and carrier of the third gear unit. A second brake alternately holds against rotation and releases the carrier of the second gear unit.

BRIEF DESCRIPTION OF THE DRAWINGS

FIG. 1 is a schematic diagram of a kinematic arrangement of an automatic transmission according to the present invention.

FIG. 2 is a chart showing the state of the friction elements of FIG. 1 corresponding to each of the speed ratios of the transmission according to the present invention.

DESCRIPTION OF THE PREFERRED EMBODIMENT

The impeller wheel 10 of a hydrokinetic torque converter 11 is driven from an engine crankshaft through an impeller casing 14. A turbine wheel 12 is located in the impeller casing 14 in toroidal fluid flow relationship with respect to the impeller wheel 10. Impeller blades define toroidal fluid outflow passages, which are in fluid communication with toroidal in-flow passages defined by blades mounted on the turbine wheel. Stator blades 16 are located in the usual fashion between the flow exit section of the turbine and the flow entrance section of the impeller.

The stator wheel is mounted on an overrunning clutch 18 having an inner race 20 splined to a nonrotating sleeve shaft 56. The overrunning clutch 18 includes rollers, which establish a locking action to prevent rotation of the stator wheel in one direction, but permitting free wheeling motion in the opposite direction. The outer race 22 of clutch 18 is fixed permanently to the stator wheel.

Turbine wheel 12 includes a hub 24, which is splined to establish a drive connection with a transmission shaft 26, which carries torque to a multiple-speed automatic transmission.

The crankshaft 28 of an internal combustion engine is permanently connected driveably to the impeller casing 14 and is adapted to be alternately driveably connected to input shaft 26 and released through operation of an hydraulically-actuated friction bypass clutch 30. When clutch 30 is released, turbine 12 is hydrokinetically connected through the torque converter to the impeller casing; when clutch 30 is engaged, the engine is mechanically connected directly to input shaft 26.

The kinematic arrangement of this invention employs two simple planetary gear units 32, 34, and one double planetary gear unit 36. Gear units 32 and 34 each include a sun gear 38, 40; a ring gear 42, 44; pinion carriers 46, 48; and planet pinions 50, 52, rotatably supported on the corresponding carrier and in continuous meshing engagement with the corresponding ring gear and sun gear. The double pinion planetary gear unit 36 includes a sun gear 54 fixed against rotation on stationary shaft 56; ring gear 58; pinion carrier 60; a set of planetary pinions 64 supported rotatably on carrier 60 in continuous meshing engagement with ring gear 58; and a set of planetary pinions 66 supported rotatably on carrier 60 in continuous meshing engagement with sun gear 54 and pinions 64.

Pinion carrier 60 is continuously driveably connected to input shaft 26 through member 68, and sun gear 38 is continuously connected to input shaft 26. Sun gear 40 and ring gear 58 are continuously driveably connected by member 70. Ring gear 44, carrier 46, and output shaft 72 are continuously driveably connected mutually.

A first brake 74, an hydraulically actuated friction brake, alternately holds ring gear 42 against rotation on the transmission housing 76 and releases that ring gear to turn freely when the brake is disengaged.

A friction clutch 78 alternately driveably connects sun gear 40 and ring gear 44 of the second planetary gear unit 34 and carrier 46 mutually when the clutch is engaged and releases them when the clutch is disengaged. Clutch 80 alternately driveably connects ring gear 42 and carrier 48 mutually when the clutch is engaged and releases that connection when the clutch is disengaged.

Clutch 82 alternately driveably connects input shaft 26, carrier 46, and ring gear 44 mutually, and releases that connection when clutch 82 is disengaged.

Clutch 84 alternately driveably connects carriers 48 and 60 when the clutch is engaged and releases that connection when the clutch is disengaged.

A brake band 86 frictionally engages a brake drum 88, to which carrier 48 is continually driveably connected, by holding that drum against rotation on the transmission casing when the brake is engaged and releasing drum 88 to turn freely when brake band 86 is released.

The transmission of FIG. 1 produces a first forward speed ratio by engaging brake 74. This action produces a torque reaction at ring gear 42 and produces a speed reduction within the first planetary gear unit 32 by driving sun gear 38 and taking the output at carrier 46 and output shaft 72.

An upshift to the second forward speed ratio results by disengaging brake 74 and engaging clutch 78. As a result of this action, a speed reduction occurs in the third planetary gear unit 36 since sun gear 54 is permanently fixed against rotation, carrier 68 is driven directly from input shaft 26, and the output is taken at ring gear 58. Carrier 46 is driven through engagement of clutch 78 and member 70 by ring gear 58.

An upshift to the third forward speed ratio results by engaging clutch 80 and disengaging clutch 78. Ring gear 58 and sun gear 40 are driven at a lower speed than that of input shaft 26 due to the speed reduction that occurs in a third planetary gear unit 36, whose carrier 60 is driven directly by input shaft 26 and whose sun gear 54 is fixed permanently against rotation. Pinion carrier 48 of the second gear unit 34 and sun gear 42 of the first planetary gear unit 32 turn at the same speed due to engagement of clutch 80. Sun gear 38 is driven directly from input shaft 26 and ring gear 44 of the second planetary gear unit 34.

An upshift to the fourth forward speed ratio, a direct drive, is accomplished by disengaging clutch 80 and engaging clutch 82 instead. In this way, input shaft 26 is connected to carrier 46 and output shaft 72 directly through engagement of clutch 82.

An upshift to the fifth forward speed ratio results by disengaging clutch 82 and engaging instead clutch 84. The speed of sun gear 40 and ring gear 58, which are fixed permanently together by member 70, is reduced in relation to the speed of input shaft 26, which drives carrier 60 and carrier 48 due to the engagement of clutch 84. With carrier 48 driven at the speed of input shaft 26 and sun gear 40 underdriven, the second gear unit 34 overdrives ring gear 48, pinion carrier 46, and output shaft 72 in relation to the speed of shaft 26.

The transmission produces reverse drive by engaging brake band 86 and disengaging all of the other friction elements. This action causes a reduction in speed of ring gear 58 and sun gear 40 in relation to the speed of input shaft 26, which drives carrier 60 of the third planetary gear unit 36, whose sun gear is fixed against rotation to provide a torque reaction. The direction of rotation of ring gear 44 is reversed and its speed reduced in relation to the speed at which its sun gear is driven. Pinion carrier 48 is held fixed against rotation to provide a torque reaction.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

What is claimed:

1. A multiple-speed automatic transmission, comprising:
   an input shaft;
   an output shaft;
   planetary gearing supported on a first axis comprising first and second planetary gear units, each gear unit having a sun gear, ring gear, carrier, and planet pinions supported rotatably on the carrier and driveably engaged with the sun gear and ring gear, carrier, and first and second planet pinions supported rotatably on the carrier, the first planet pinion driveably engaged with the sun gear, the second planet pinion driveably engaged with the ring gear and first planet pinion;
   the input shaft and carrier of the third gear unit continually driveably connected mutually; the ring gear of the third gear unit continually driveably connected to the sun gear of the second gear unit; the ring gear of the second gear unit, carrier of the first gear unit, and output shaft continually driveably connected mutually; and
   a first brake for alternately holding against rotation and releasing the gear of the first gear unit.

2. The transmission of claim 1, further comprising a first clutch for alternately driveably connecting and releasing the ring gear of the second gear unit and sun gear of the second gear unit.

3. The transmission of claim 1, further comprising a second clutch for alternately driveably connecting and releasing the ring gear of the first gear unit and carrier of the second gear unit.

4. The transmission of claim 1, further comprising a third clutch for alternately driveably connecting and releasing the carrier of the first gear unit and input shaft.

5. The transmission of claim 1, further comprising a fourth clutch for alternately driveably connecting and releasing the carrier of the second gear unit and carrier of the third gear unit.

6. The transmission of claim 1, further comprising a second brake for alternately holding against rotation and releasing the carrier of the second gear unit.

7. The transmission of claim 1, further comprising:
   a first clutch for alternately driveably connecting and releasing the ring gear of the second gear unit and sun gear of the second gear unit; and
   a second clutch for alternately driveably connecting and releasing the ring gear of the first gear unit and carrier of the second gear unit.

8. The transmission of claim 7, further comprising a third clutch for alternately driveably connecting and releasing the carrier of the first gear unit and input shaft.

9. The transmission of claim 8, further comprising a fourth clutch for alternately driveably connecting and releasing the carrier of the second gear unit and carrier of the third gear unit.

10. The transmission of claim 8, further comprising a second brake for alternately holding against rotation and releasing the carrier of the second gear unit.

11. The transmission of claim 9, further comprising a second brake for alternately holding against rotation and releasing the carrier of the second gear unit.

12. A multiple-speed automatic transmission, comprising:

an input shaft;

an output shaft;

planetary gearing supported on a first axis comprising first and second planetary gear units, each gear unit having a sun gear, ring gear, carrier, and planet pinions supported rotatably on the carrier and driveably engaged with the sun gear and ring gear, and a third planetary gear unit having a sun gear, ring gear, carrier, and first and second planet pinions supported rotatably on the carrier, the first planet pinion driveably engaged with the sun gear, the second planet pinion driveably engaged with the ring gear and first planet pinion;

the input shaft and carrier of the third gear unit continually driveably connected mutually; the ring gear of the third gear unit continually driveably connected to the sun gear of the second gear unit; the ring gear of the second gear unit, carrier of the first gear unit, and output shaft continually driveably connected mutually;

a first brake for alternately holding against rotation and releasing the ring gear of the first gear unit;

a first clutch for alternately driveably connecting and releasing the ring gear of the second gear unit and sun gear of the second gear unit;

a second clutch for alternately driveably connecting and releasing the ring gear of the first gear unit and carrier of the second gear unit; and an hydrokinetic unit having an impeller and a turbine mounted on a second axis disposed parallel to the first axis.

13. A multiple-speed automatic transmission, comprising:

an input shaft;

an output shaft;

planetary gearing supported on a first axis comprising first and second planetary gear units, each gear unit having a sun gear, ring gear, carrier, and planet pinions supported rotatably on the carrier and driveably engaged with the sun gear and ring gear, and a third planetary gear unit having a sun gear, ring gear, carrier, and first and second planet pinions supported rotatably on the carrier, the first planet pinion driveably engaged with the sun gear, the second planet pinion driveably engaged with the ring gear and first planet pinion;

the input shaft and carrier of the third gear unit continually driveably connected mutually; the ring gear of the third gear unit continually driveably connected to the sun gear of the second gear unit; the ring gear of the second gear unit, carrier of the first gear unit, and output shaft continually driveably connected mutually;

a first brake for alternately holding against rotation and releasing the ring gear of the first gear unit;

a first clutch for alternately driveably connecting and releasing the ring gear of the second gear unit and sun gear of the second gear unit;

a second clutch for alternately driveably connecting and releasing the ring gear of the first gear unit and carrier of the second gear unit;

a third clutch for alternately driveably connecting and releasing the carrier of the first gear unit and input shaft;

a fourth clutch for alternately driveably connecting and releasing the carrier of the second gear unit and carrier of the third gear unit;

a second brake for alternately holding against rotation and releasing the carrier of the second gear unit; and an hydrokinetic unit having an impeller and a turbine mounted on a second axis disposed parallel to the first axis.

* * * * *